(12) United States Patent
Nagata et al.

(10) Patent No.: US 11,132,562 B2
(45) Date of Patent: Sep. 28, 2021

(54) CAMERA SYSTEM TO DETECT UNUSUAL CIRCUMSTANCES AND ACTIVITIES WHILE DRIVING

(71) Applicant: Toyota Motor Engineering & Manufacturing North America, Inc., Plano, TX (US)

(72) Inventors: Katsumi Nagata, Foster City, CA (US); Shojiro Takeuchi, Saratoga, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 222 days.

(21) Appl. No.: 16/446,539

(22) Filed: Jun. 19, 2019

(65) Prior Publication Data

US 2020/0401820 A1 Dec. 24, 2020

(51) Int. Cl.
*G06K 9/00* (2006.01)
*B60W 30/095* (2012.01)
*G01C 21/16* (2006.01)
*G01C 21/36* (2006.01)

(52) U.S. Cl.
CPC ....... *G06K 9/00805* (2013.01); *B60W 30/095* (2013.01); *G01C 21/16* (2013.01); *G01C 21/3602* (2013.01)

(58) Field of Classification Search
CPC . G01C 21/3602; G01C 21/16; B60W 30/095; G06K 9/00805
See application file for complete search history.

(56) References Cited

U.S. PATENT DOCUMENTS

| 5,541,590 | A | 7/1996 | Nishio |
| 5,666,157 | A | 9/1997 | Aviv |
| 6,820,897 | B2 * | 11/2004 | Breed .................. B60R 21/015 280/735 |
| 6,898,528 | B2 | 5/2005 | Zorka et al. |
| 7,317,406 | B2 | 1/2008 | Wolterman |
| 7,613,569 | B2 | 11/2009 | Sherony et al. |
| 7,839,292 | B2 | 11/2010 | Wang et al. |
| 9,132,775 | B2 | 9/2015 | Ohama et al. |

(Continued)

FOREIGN PATENT DOCUMENTS

| WO | WO2018155159 | 8/2018 |
| WO | WO2018211301 | 11/2018 |
| WO | WO20189053672 | 3/2019 |

*Primary Examiner* — Mia M Thomas
(74) *Attorney, Agent, or Firm* — Snell & Wilmer LLP

(57) ABSTRACT

Methods, systems, and apparatus for a detection system. The detection system includes a memory configured to store image data and a first camera configured to capture first image data including a first set of objects in the environment when the vehicle is moving. The electronic control unit is configured to obtain, from the first camera, the first image data including the first set of objects, determine a motion of an object of the first set of objects based on the first image data, and determine that the motion of the object will be different than a baseline motion for the object. The electronic control unit is configured to record and capture, in the memory and using the camera, the first image data for a time period before and after the determination that the motion of the object will be different than the baseline motion.

25 Claims, 7 Drawing Sheets

(56) References Cited

U.S. PATENT DOCUMENTS

| | | | |
|---|---|---|---|
| 9,335,766 B1* | 5/2016 | Silver | G01S 17/04 |
| 9,429,943 B2 | 8/2016 | Wilson et al. | |
| 10,235,886 B1 | 3/2019 | Baughman et al. | |
| 10,843,690 B2* | 11/2020 | Shalev-Shwartz | B60T 7/22 |
| 2010/0033571 A1* | 2/2010 | Fujita | B60W 40/02 |
| | | | 348/149 |
| 2011/0175798 A1* | 7/2011 | Sato | B60K 35/00 |
| | | | 345/7 |
| 2014/0098230 A1* | 4/2014 | Baur | B60R 16/0232 |
| | | | 348/148 |
| 2014/0309864 A1* | 10/2014 | Ricci | G01C 21/365 |
| | | | 701/36 |
| 2014/0350797 A1* | 11/2014 | D'Addetta | B60R 21/0132 |
| | | | 701/45 |
| 2014/0375807 A1* | 12/2014 | Muetzel | G07C 5/0866 |
| | | | 348/148 |
| 2015/0092056 A1* | 4/2015 | Rau | G06K 9/00791 |
| | | | 348/148 |
| 2015/0154460 A1* | 6/2015 | Baba | G06T 7/246 |
| | | | 382/104 |
| 2016/0093214 A1* | 3/2016 | Wu | G08G 1/147 |
| | | | 348/148 |
| 2016/0155004 A1* | 6/2016 | Shiraishi | G06K 9/00335 |
| | | | 348/77 |
| 2016/0176345 A1* | 6/2016 | Lee | G06K 9/4604 |
| | | | 348/148 |
| 2016/0307052 A1* | 10/2016 | Han | G06K 9/00798 |
| 2017/0010122 A1* | 1/2017 | Abe | G08G 1/096758 |
| 2017/0286826 A1 | 10/2017 | Min et al. | |
| 2017/0309082 A1* | 10/2017 | Fellner | G06K 9/00785 |
| 2017/0372459 A1* | 12/2017 | Tan | G06T 7/13 |
| 2018/0158323 A1* | 6/2018 | Takenaka | H04N 5/77 |
| 2018/0170375 A1 | 6/2018 | Jang et al. | |
| 2018/0286258 A1 | 10/2018 | Derbanne | |
| 2018/0299900 A1* | 10/2018 | Bae | G06K 9/00805 |
| 2018/0348777 A1 | 12/2018 | Zawabe et al. | |
| 2019/0139411 A1* | 5/2019 | Dhull | G09F 19/18 |
| 2019/0189087 A1* | 6/2019 | Helot | B60K 35/00 |
| 2019/0232974 A1* | 8/2019 | Reiley | B60W 60/0013 |
| 2019/0385452 A1* | 12/2019 | Nangeroni | G08G 1/205 |
| 2020/0202148 A1* | 6/2020 | Wright | G06K 9/00838 |
| 2020/0320309 A1* | 10/2020 | Nagata | H04N 7/188 |
| 2021/0081683 A1* | 3/2021 | Lynam | B60W 10/04 |

* cited by examiner

CAMERA SYSTEM TO DETECT UNUSUAL CIRCUMSTANCES AND ACTIVITIES WHILE DRIVING

BACKGROUND

Field

This disclosure relates to detecting, predicting and documenting any unusual circumstances or activities while driving a vehicle.

Description of the Related Art

Generally, collision prevention devices are reactive systems that perform an action, such as sound an alarm or otherwise warn a driver, in response to a vehicle or object entering within a threshold distance of the vehicle. For example, when a vehicle attempts to merge or shift lanes, a lane change assist system may monitor the perimeter of the vehicle and alert the driver if the vehicle is in the blind spot. These systems, however, are unable to predict that another vehicle is behaving erratically or unusually when the other vehicle is not within the perimeter of the vehicle. Moreover, these reactive systems only detect vehicles and no other objects that may be acting unusually, such as a ball rolling into the street or an object being dropped from an overpass.

Additionally, these reactive systems may only notify or alert the occupants of the vehicle of the actions of the other vehicle. These systems do not prevent the actions of the other vehicle nor do the reactive systems record the incident for later analysis, and thus, even though the anti-theft device may alert the occupants of the vehicle, very little else may be done to prevent the action or mitigate any consequences. Furthermore, unusual activities or circumstances may occur within the vehicle. For example, a driver may become distracted by their actions, such as by eating, texting or otherwise being distracted.

Accordingly, there is a need for a system and method for anticipating, predicting and/or reporting unusual activities within and surrounding the vehicle when the vehicle is in motion.

SUMMARY

In general, one aspect of the subject matter described in this disclosure may be embodied in a detection system for a vehicle. The detection system includes a first camera configured to capture first image data including a first set of objects in the environment when the vehicle is moving. The detection system includes a memory configured to store image data. The detection system includes an electronic control unit coupled to the first camera and the memory. The electronic control unit is configured to obtain, from the first camera, the first image data including the first set of objects. The electronic control unit is configured to determine a motion of an object of the first set of objects based on the first image data. The electronic control unit is configured to determine that the motion of the object will be different than a baseline motion for the object. The electronic control unit is configured to record and capture, in the memory and using the camera, the first image data for a time period before and after the determination that the motion of the object will be different than the baseline motion.

These and other embodiments may optionally include one or more of the following features. The detection system may include at least one of a vehicle speed sensor or a navigation unit configured to detect or determine a vehicle speed of the vehicle. The electronic control unit may be configured to determine that the vehicle is moving based on the vehicle speed of the vehicle. The electronic control unit may be configured to activate the first camera in response to determine that the vehicle is moving.

The first camera may include multiple external cameras. The multiple external cameras may be configured to capture different views of the surrounding environment outside the vehicle. The electronic control unit may be configured to recognize the object among the first multiple of objects. The electronic control unit may be configured to match the object to a baseline object. The baseline object may be associated with a corresponding baseline motion. The corresponding baseline motion may be used as the baseline motion for the object.

The detection system may include a second camera. The second camera may be configured to capture second image data of a passenger compartment of the vehicle. The electronic control unit may be configured to obtain, from the second camera, the second image data of the passenger compartment including a second set of objects. The electronic control unit may be configured to determine motions of each of the second set of objects. The electronic control unit may be configured to determine that a motion of an object of the second set of objects is different than a second baseline motion. The electronic control unit may be configured to record and capture, in the memory and using the second camera, the second image data for a time period before and after the determination that the motion of the object of the second set of objects is different than the second baseline motion.

The detection system may include a navigation unit. The navigation unit may be configured to obtain navigational map information. The navigational map information may include a location of an entity and a current location of the vehicle. The electronic control unit may be further configured to activate the second camera when the current location of the vehicle is within a threshold distance of the location of the entity. The electronic control unit may be configured to alert or notify a user of a user device that an unusual activity is occurring. The electronic control unit may alert or notify the user in response to the determination that the motion of the object of the second plurality of objects is different than the second baseline motion.

In another aspect, the subject matter may be embodied in a detection system for a vehicle. The detection system includes a first camera. The first camera is configured to capture first image data of a surrounding environment of the vehicle. The first image data includes a first set of objects within the surrounding environment. The detection system includes a second camera. The second camera is configured to capture second image data of a passenger compartment of the vehicle. The second image data includes a second set of objects within the passenger compartment of the vehicle. The detection system includes a memory configured to store the first image data and the second image data. The detection system includes an electronic control unit. The electronic control unit is coupled to the first camera, the second camera and the memory. The electronic control unit is configured to determine motions of each of the first set of objects within the surrounding environment based on the first image data. The electronic control unit is configured to determine motions of each of the second set of objects within the passenger compartment based on the second image data. The electronic control unit is configured to determine that the motion of a first object of the first set of objects or a second object among the second set of objects is different than a first baseline motion or a second baseline motion, respectively. The electronic control unit is configured to record and capture, in the memory, the first image data or the second image data.

In another aspect, the subject matter may be embodied in a method for detecting an unusual activity. The method includes obtaining, by a processor and from a first camera, first image data of a surrounding environment including a first set of objects. The method includes determining, by the processor, motions of each of the first set of objects within the surrounding environment based on the first image data. The method includes determining, by the processor, that the motion of an object of the first set of objects within the surrounding environment will be different than a baseline motion for the object. The method includes recording, in memory and by the processor and using the first camera, the first image data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for detecting unusual circumstances or activities while the vehicle is driving. Particular embodiments of the subject matter described in this disclosure may be implemented to realize one or more of the following advantages. The unusual circumstances or activities detection, recording and reporting system ("detection system") detects, records and/or reports unusual circumstances or activities that occur around, in proximity and/or within the external or internal environment of the vehicle when the vehicle is in motion. The detection system uses artificial intelligence including machine algorithm learning with models to anticipate, predict or otherwise determine when an unusual circumstance or activity ("unusual activity") occurs or is about to occur. By anticipating, predicting or otherwise determining when the unusual activity occurs or is about to occur, the detection system proactively anticipates the unusual activity and may act to prevent, report or otherwise record or document the unusual activity. For example, the detection system may alert the police of an erratic driver or an impending vehicle accident. In another example, the detection system may record the erratic driver, the details of the impending vehicle accident or other unusual activities when the vehicle is in motion. In another example, the detection system may record a distracted driver within the vehicle and alert a parent or owner of the vehicle of the unusual behavior.

Other benefits and advantages include the capability to activate when an unusual activity or circumstance is anticipated or predicted. By activating only when the detection system anticipates or predicts that an unusual activity is about to occur, the detection system minimizes the amount of energy used by the detection system, which maximizes the energy efficiency of the vehicle and prolongs the battery or other fuel source of the vehicle. Moreover, the detection system captures and records image date before, after and during the occurrence of the unusual activity to fully document the circumstances around the unusual activity.

Additionally, the detection system may perform other operations of the vehicle, such as notify or alert the driver or other party, communicate with another vehicle or party, and/or disable a feature of the vehicle, to prevent or mitigate any consequences of the unusual activity. The detection system may also adapt to different environmental factors and/or circumstances of the environment. By using artificial intelligence in predicting the unusual activity, the detection system may account for various other environmental factors, such as the state of a traffic signal or the weather. This allows for a more precise and accurate understanding of different types of unusual activities or circumstances. The detection system may learn from each instance of a potentially unusual activity or circumstance.

Figure 1:
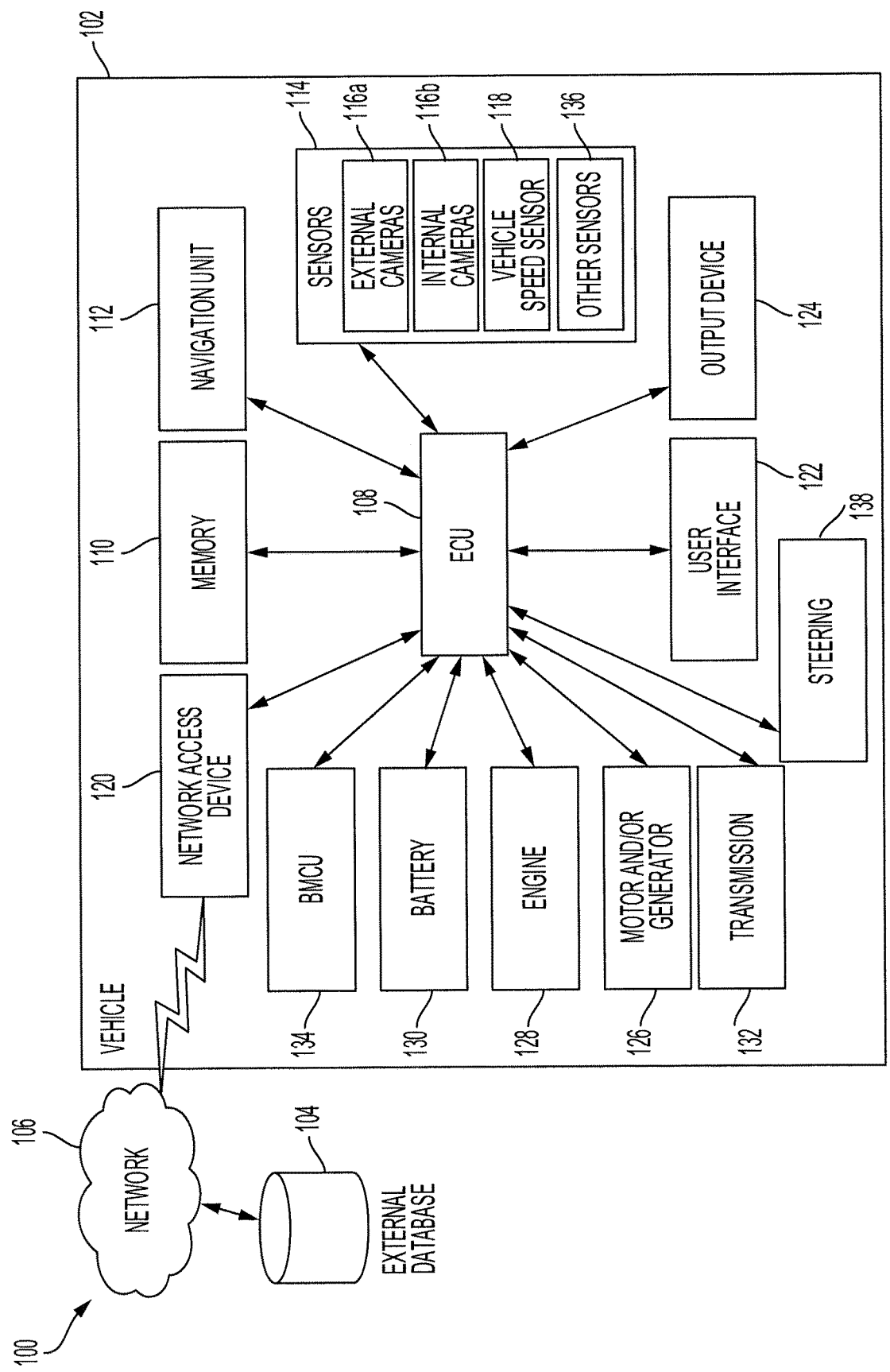
FIG. 1 is a block diagram of an example detection system according to an aspect of the invention.

FIG. 1 is a block diagram of a detection system 100. The detection system 100 may be retro-fitted, coupled to, include or be included within a vehicle 102. The detection system 100 may couple, connect to, or include an external database 104. The detection system 100 may have a network 106 that links the external database 104 with the vehicle 102. The network 106 may be a local area network (LAN), a wide area network (WAN), a cellular network, the Internet, or combination thereof, that connects, couples and/or otherwise communicates between the vehicle 102 and the external database 104.

The detection system 100 detects, identifies, predicts and/or anticipates unusual activities that occur and/or may potentially occur in the near future within or surrounding and/or inside the vehicle 102 when the vehicle 102 is driving or otherwise in motion. The detection system 100 may activate just prior to the unusual activity and record and capture image data before, during and after the occurrence of the unusual activity. The detection system 100 may use artificial intelligence including a machine learning algorithm to predict when an unusual activity is about to or has occurred, which may impact, damage or present a danger to the vehicle 102.

The detection system 100 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a-b may be semi-autonomous or autonomous. That is, the vehicle 102 may be self-maneuvering and navigate without human input. An autonomous vehicle may have and use one or more sensors and/or a navigation unit to drive autonomously.

The detection system 100 includes one or more processors, such as an electronic control unit (ECU) 108 and a memory 110. The detection system 100 may include other components, such as a navigation unit 112, one or more sensors 114 including one or more external cameras 116a, one or more internal cameras 116b, a vehicle speed sensor 118 and/or other sensors 136 including a proximity sensor, a network access device 120, a user interface 122 and/or an output device 124. The detection system 100 may couple, connect to, and/or include one or more vehicle components such as the motor and/or generator 126, the engine 128, the battery 130, the transmission 132 and/or the battery management control unit (BMCU) 134.

The ECU 108 may be implemented as a single ECU or as multiple ECUs. The ECU 108 may be electrically coupled to some or all of the other components within the vehicle 102, such as the motor and/or generator 126, the transmission 132, the engine 128, the battery 130, the battery management control unit (BMCU) 134, the memory 110, the network access device 120 and/or one or more sensors 114. The ECU 108 may include one or more processors or controllers specifically designed for predicting unusual activities within the surrounding environment of the vehicle 102 and within the vehicle 102 when the vehicle 102 is in motion. The unusual activities may be external to the vehicle 102 and/or internal to the vehicle 102. The ECU 108 may generate predictive models and use machine learning algorithms to anticipate unusual activities before the unusual activities occur.

An unusual activity may be a motion of any object that is not normal within the external and/or internal environment of the vehicle when the vehicle is in motion. The unusual activity may be an action or motion performed or about to be performed by an object that is not normal within the external and/or internal environment of the vehicle. That is, the action of the object is not within the baseline representation, model or behavior expected of the object within the environment, and thus, may be considered unusual, suspicious or otherwise not normal.

The ECU 108 may analyze the external and internal environment of the vehicle 102 and compare the data to a baseline and/or input the data into a model to anticipate, predict or otherwise determine any unusual activities within the environment when the vehicle is in motion. If an unusual activity is predicted or otherwise detected, the ECU 108 may act to record, document, provide or otherwise act to mitigate consequences of the unusual activity. The ECU 108 may be coupled to a memory 110 and execute instructions that are stored in the memory 110. The motion of the vehicle 102 adds a different dimension to the prediction when compared to a vehicle 102 that is stationary. When a vehicle 102 is in motion, the detection system 100 must account for different circumstances than when a vehicle is stationary. For example, when a ball rolls across a street into the path of the vehicle 102 when the vehicle 102 is in motion, the detection system 100 may anticipate that an individual may chase after the ball into the street and into the path of the moving vehicle 102. If the vehicle 102 is stationary and parked in a driveway in a residential area, the ball rolling across the street may not impact or approach the vehicle 102 and may be a regular occurrence in a residential area with families. Thus, the ball rolling across the street would not be unusual if the vehicle 102 were stationary. If the vehicle 102 is in motion, however, the rolling ball may intersect the path of the vehicle 102, and thus, the detection system 102 would predict that the ball rolling into the street is unusual.

The memory 110 may be coupled to the ECU 108 and store instructions that the ECU 108 executes. The memory 110 may include one or more of a Random Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. Moreover, the memory 110 may be used to record and store image data before, after and/or during the occurrence of the unusual activity to document the unusual activity.

The detection system 100 may include a user interface 122. The detection system 100 may display one or more notifications on the user interface 122. The one or more notifications on the user interface 122 may notify occupants of the vehicle when the detection system 100 is initialized or activated. The user interface 122 may include an input/output device that receives user input from a user interface element, a button, a dial, a microphone, a keyboard, or a touch screen. For example, the user interface 122 may receive user input that may include configurations as to the amount of image data or the length of the video to record when an unusual activity is detected. Other configurations may include a sensitivity to the surrounding environment as to when to trigger the activation of the cameras 116a-b, for example. The user interface 122 may provide an output to an output device, such as a display, a speaker, an audio and/or visual indicator, or a refreshable braille display. For example, the user interface 122 may playback recording on a user display.

The detection system 100 may include a network access device 120. The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from the external database 104. For example, the ECU 108 may communicate with the external database 104 to obtain baseline models of activities and objects at a current location of the vehicle 102, via the network 106. The detection system 100 may use the baseline models to extrapolate the unusualness of an object, coupled object or motion of the object to anticipate, predict or determine unusual activities surrounding the vehicle 102.

The detection system may include a navigation unit 112 and/or one or more sensors 114. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 120. The vehicle 102 may include a Global Positioning System (GPS) unit (not shown) for detecting location data including a current location of the vehicle 102 and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations. Other information, such as a current speed of the vehicle 102, may be extrapolated, interpreted or otherwise calculated from the data obtained from the navigation unit.

The navigation unit 112 may provide and obtain navigational map information including location data, which may include a current location, a starting location, a destination location and/or a route between the starting location or current location and the destination location of the vehicle 102. The navigation unit 112 may include a memory (not shown) for storing the route data. The navigation unit 112 may receive data from other sensors capable of detecting data corresponding to location information. For example, the other sensors may include a gyroscope or an accelerometer.

The navigational map information may include entity information. The entity information may include locations of places of interest, such as a liquor store or a restaurant. These different entities may be one factor in determining whether an action of an object is unusual. For example, if the vehicle 102 visited a liquor store or a restaurant, the detection system 100 may anticipate that the driver purchased a meal or a drink, which may indicate that the driver may plan on eating or drinking while driving.

Figure 6:
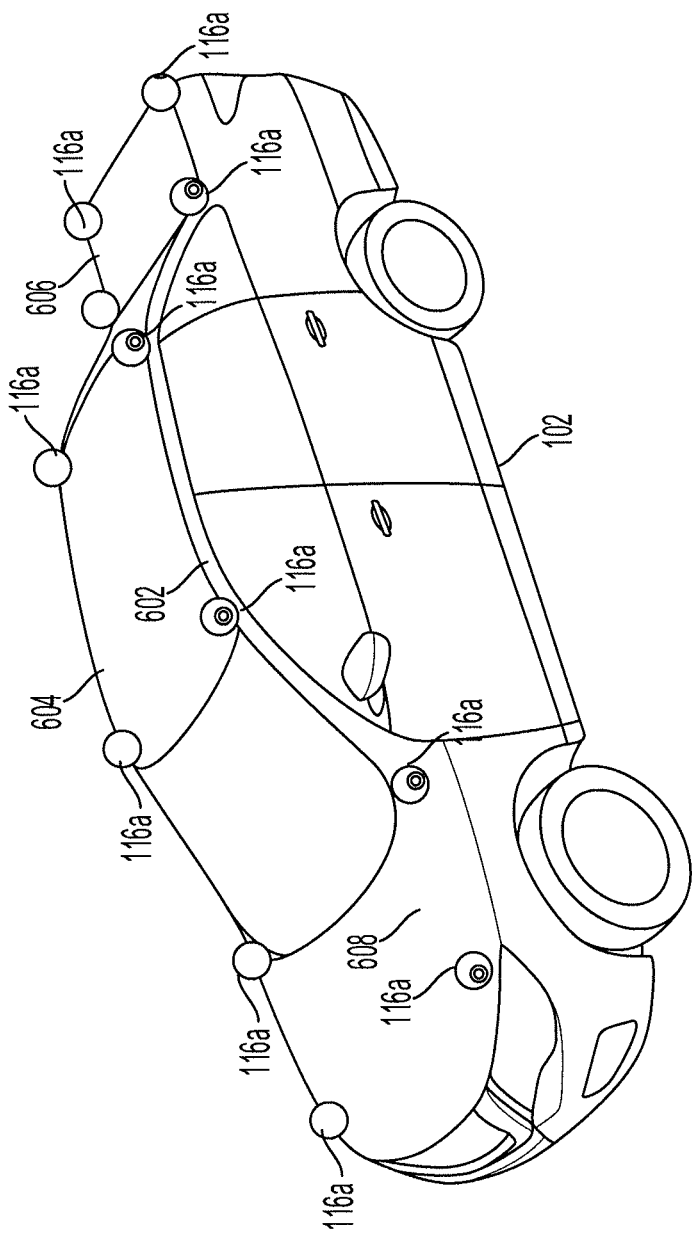
FIG. 6 shows an example illustration of the positioning of one or more external cameras of the detection system of FIG. 1 on the vehicle according to an aspect of the invention.

The one or more sensors 114 may include one or more external cameras 116a, one or more internal cameras 116b, a vehicle speed sensor 118 and/or other sensors 136 including a proximity sensor. The one or more external cameras 116a may include multiple cameras positioned either on the outside of the vehicle 102 and/or within the vehicle 102 but directed outward to capture different views of the surrounding environment outside the vehicle 102, as shown in FIG. 6 for example. The one or more external cameras 116a may be positioned along a frame 602 of the vehicle 102, such as along the roof 604, the trunk 606 or the front 608 of the vehicle 102. The different views of the surrounding environment may be used to form a panoramic or 360 degree image of the surrounding environment outside the vehicle 102. The one or more external cameras 116a-b may capture image data that includes a single frame or image or a continuous video of the surrounding environment outside the vehicle 102.

Figure 7:
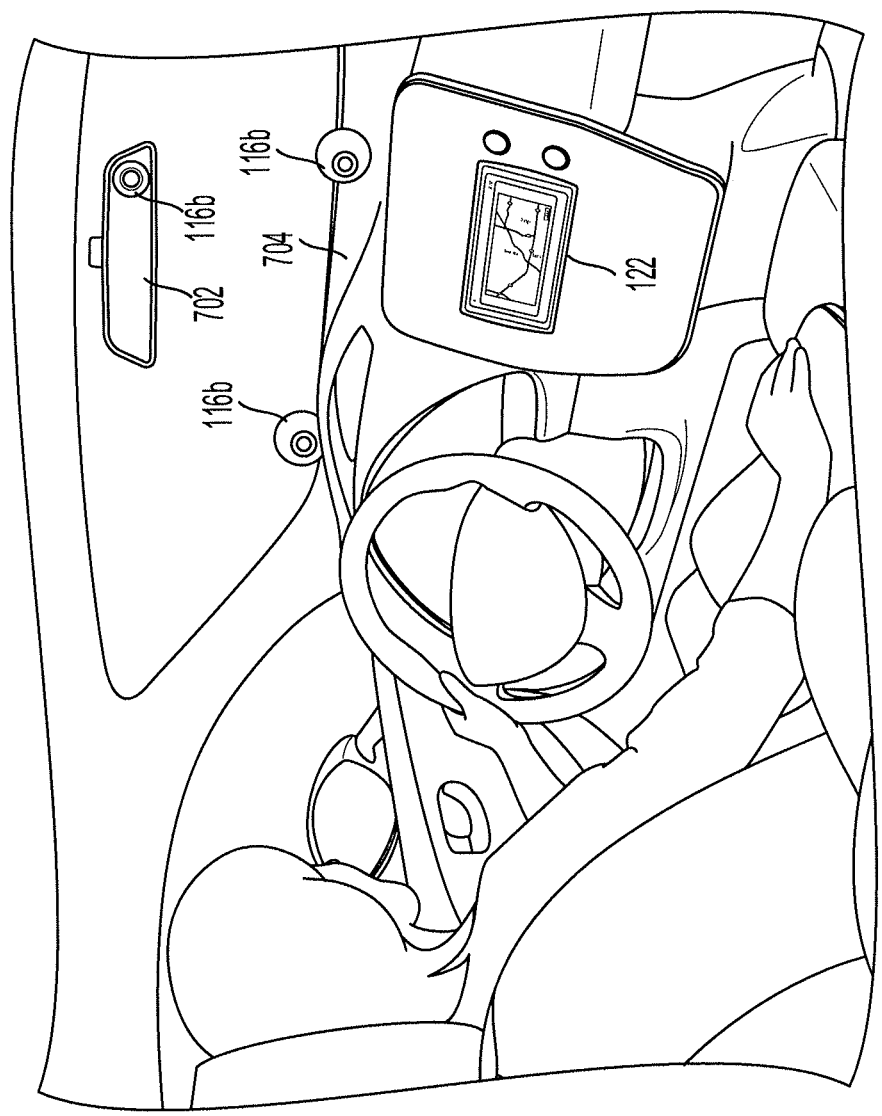
FIG. 7 shows an example illustration of the positioning of one or more internal cameras of the detection system of FIG. 1 within the vehicle according to an aspect of the invention.

The one or more internal cameras 116b may include multiple cameras positioned within the vehicle 102 to capture different views within the cabin of the vehicle 102, as shown in FIG. 7 for example. The one or more internal cameras 116b may be positioned within the vehicle 102, such as on the rearview mirror 702 or in the corner of the dashboard 704. The one or more internal cameras 116b may capture image data that includes a single frame or image or a continuous video of the environment inside or within the vehicle 102. The different views within the vehicle may be used to form the panoramic or 360 degree image of the entire cabin, which allows the detection system 100 to capture unusual activities within the vehicle 102, such as a distracted individual texting, eating, drinking or otherwise distracted from the roadway or an individual that is drinking.

The one or more sensors 114 may include a vehicle speed sensor 118. The vehicle speed sensor 118 may measure the amount of rotation of the multiple wheels to determine whether the vehicle 102 is in motion. The one or more sensors 114 may include other sensors 136, such as a proximity sensor, to measure a distance or detect objects within a threshold distance of the vehicle 102. The other sensors 136 may include throttle sensor to determine a position, gear or mode of the transmission 132 or engine 128 of the vehicle 102.

The detection system 100 may include an output device 124. The output device 124 may be an audio indicator, a visual indicator, a communication device or other output device. The audio or visual indicator may be used to sound an alarm or flash an alarm, respectively, for example. The communication device may be used to contact and communicate with another vehicle, such as over Vehicle-to-Vehicle (V2V) communication, the police, the insurance company or other entity.

The detection system 100 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. The vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 134 may be coupled to the battery 130 and may control and manage the charging and discharging of the battery 130. The BMCU 134, for example, may measure, using battery sensors, parameters used to determine the state of charge (SOC) of the battery 130. The BMCU 134 may control the battery 130.

The one or more vehicle components may include the transmission 132. The transmission 132 may have different gears and/or modes, such as park, drive and/or neutral and may shift between the different gears. The transmission 132 manages the amount of power that is provided to the wheels of the vehicle 102 given an amount of speed. The one or more vehicle components may include a steering device 138. The steering device 138 controls the direction of the movement of the vehicle to follow a desired course. For example, the steering device 138 may be controlled to adjust the movement of the vehicle 102 to avoid a collision upon detection of an unusual event, such as cross-traffic that is entering an intersection.

The detection system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a relational database or behavioral model database that provides models of normal motions and/or features of different objects. The external database 104 may be updated and/or provide updates in real-time. The external database 104 may store and/or provide the models to the ECU 108. The external database 104 may also store one or more situational factors, such as the state of one or more traffic signal, and provide the situational factors to the ECU 108 to assist in determine whether an action of the object is unusual or otherwise different from a baseline. The ECU 108 may also update and/or provide information to the external database 104 to inform other drivers of the unusual activity at the location of the vehicle 102.

Figure 2:
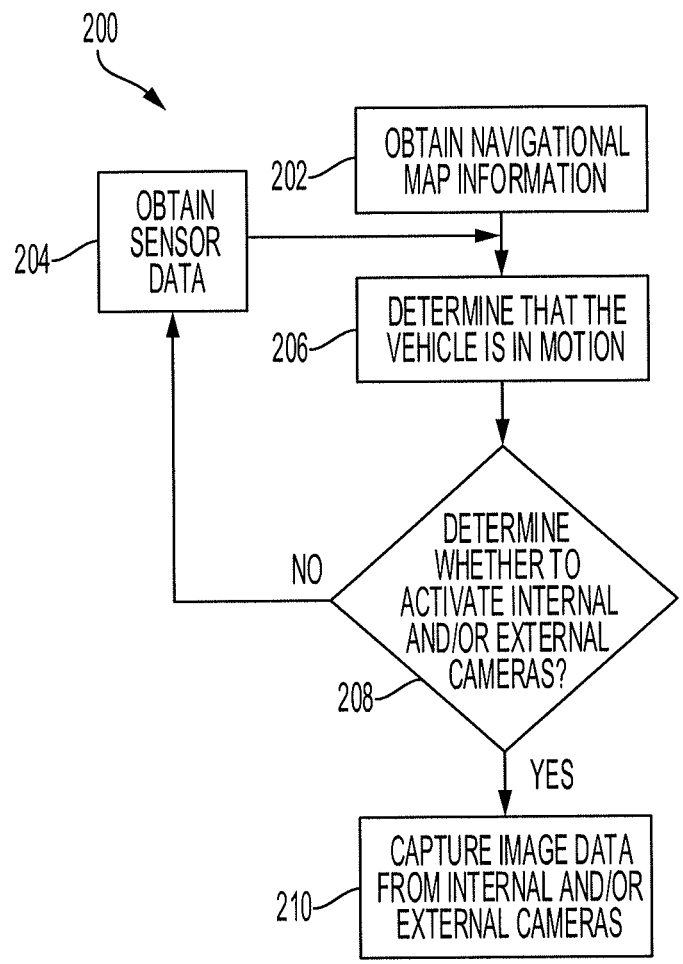
FIG. 2 is a flow diagram of an example process for capturing image data to predict and/or detect an unusual activity using the detection system of FIG. 1 according to an aspect of the invention.

FIG. 2 is a flow diagram of an example process 200 for capturing the internal and/or external image data to use to predict and/or detect an unusual activity when the vehicle 102 is in motion. One or more computers or one or more data processing apparatuses, for example, the ECU 108 of the detection system 100 of FIG. 1, appropriately programmed, may implement the process 200.

The detection system 100 obtains navigational map information (202). The detection system 100 may use the navigation unit 112 to obtain the navigational map information including a current location of the vehicle 102, a current time of day, and other entity information, such as places of interest in proximity or within a threshold distance of the vehicle 102. The detection system 100 may extract the current location and/or the other entity information from the navigational map information. For example, the detection system 100 may use a GPS system to determine the current location of the vehicle 102 and may provide the current location of the vehicle 102 to an external database 104 to obtain nearby entity information to identify different places of interest in proximity to the vehicle 102. Some places of interest may include a liquor store, a restaurant, a fast food restaurant or other place of interest that may contribute to an unusual activity, such as drinking alcohol, eating food or other activity that may cause a driver to behave distracted, erratic or otherwise unusually.

The navigational map information may include other information, such as the current speed and direction of travel of the vehicle. The detection system 100 may use the navigational map information to assist in determine whether an activity of an object is unusual, not normal or otherwise unordinary.

The detection system 100 may obtain sensor data including a current speed of the vehicle, a current mode and/or gear of the transmission 132 and/or situational factors using one or more sensors 114 (204). The detection system 100 may use a vehicle speed sensor 118 and measure the rotation speed, e.g., the revolutions per minute, of one or more wheels of the vehicle 102 to determine the current speed of the vehicle 102. The detection system 100 may use other sensors 136 including a throttle sensor to determine the current mode and/or gear of the transmission 132. The current mode and/or gear of the transmission 132 may be a drive mode, park mode, reverse mode, neutral mode or other mode and/or gear.

In some implementations, the detection system 100 connects with the external database 104 via the network 106. The external database 104 may be a traffic information database, for example. The detection system 100 may provide the current location of the vehicle 102 to the traffic information database, and in response, receive situational factors including the state of one or more traffic lights or signals within the vicinity of the current location of the vehicle 102.

Other situational factors may include one or more surrounding vehicles in proximity to the vehicle 102 along with a current speed and/or a current direction of travel of the one or more surrounding vehicles. The detection system 100 may use a proximity sensor to detect one or more surrounding vehicles in proximity to the vehicle 102 and/or receive information regarding the location of one or more surrounding vehicles from the external database 104 or V2V communication. The information may include the location, speed and direction of travel of the one or more surrounding vehicles in proximity to the vehicle 102.

Once the sensor data and/or the navigational map information is obtained, the detection system 100 may determine that the vehicle is in motion based on the sensor data and/or the navigational map information (206). The detection system 100 may determine the current speed of the vehicle 102 using the vehicle speed sensor 118. In some implementations, the detection system 100 tracks and extracts the current location of the vehicle 102 over a period of time from the navigational map information and calculates the speed of the vehicle 102. If the speed of the vehicle 102 is greater than a threshold speed, the detection system 100 may determine that the vehicle 102 is in motion.

The detection system 100 may determine that the transmission 132 is in a drive and/or reverse mode or gear from the sensor data, and as such, the detection system 100 may determine that the vehicle 102 is in motion when the mode or gear of the transmission 132 is in the drive mode, reverse mode or any other mode besides the park mode or gear and/or the neutral mode or gear.

After the detection system 100 determines that the vehicle 102 is in motion, the detection system 100 determines whether to activate the external cameras 116*a* and/or internal cameras 116*b* (208). The detection system 100 may determine whether to activate the internal cameras 116*b* and/or external cameras 116*a* based on the motion of the vehicle 102, the sensor data and/or the navigational map information. When the vehicle 102 is in motion, the detection system 100 may activate the external cameras 116*a* and/or internal cameras 116*b*. By activating the external cameras 116*a* and/or internal cameras 116 when the vehicle 102 is in motion, the detection system 100 may deactivate the external cameras 116*a* and/or internal cameras 116*b* when the vehicle 102 is parked or not in motion, and thus, the detection system 100 reduces the use of resources and electrical energy, which improves energy efficiency.

The detection system 100 may activate one of the external cameras 116*a* or the internal cameras 116*b* further based on the sensor data. For example, the detection system 100 may activate the external cameras 116*a* but not the internal cameras 116*b* when the detection system 100 detects a number of vehicles surrounding the vehicle 102, e.g., when the number of vehicles is greater than a threshold amount. In another example, the detection system 100 may activate the external cameras 116*a* when another vehicle is in proximity, e.g., within a threshold distance, of the vehicle 102. In another example, the detection system 100 may activate the internal cameras 116*b* but not the external cameras 116*a* when a load on the driver seat of the vehicle 102 is greater than a threshold amount, which indicates that a person is sitting on the driver seat of the vehicle 102 or when the vehicle has frequented a location, such as a liquor store or restaurant based on the entity information and current location of the vehicle 102.

The detection system 100 may activate the one or more internal cameras 116b and/or the one or more external cameras 116a based on the navigational map information. For example, the detection system 100 may determine that the current location of the vehicle 102 is near or within a threshold distance of an entity that serves alcohol based on entity information including a location of the entity extracted from the navigational map information. If the current location of the vehicle 102 is near an establishment that serves alcohol this may be an indication that a driver of the vehicle 102 has purchased alcohol and/or has consumed alcohol, and as such, the detection system 100 may activate one or more internal cameras 116b to monitor a driver of the vehicle 102. Similarly, if the establishment is a restaurant or other entity that may cause the driver of the vehicle 102 to be distracted while driving, e.g., by eating food while driving, the detection system 100 may activate the one or more internal cameras 116b.

Moreover, the detection system 100 may determine to activate the external cameras 116a and/or internal cameras based on a combination of the sensor data and the motion of the vehicle 102. For example, the detection system 100 may weight different factors, such as the proximity of one or more other vehicles, the current location of the vehicle 102, e.g., relative to a location of an entity, or the motion of the vehicle 102 to determine to activate one or more external cameras 116a, one or more internal cameras 116b, both or none.

Once the detection system 100 activates the one or more external cameras 116a and/or the one or more internal cameras 116b, the detection system 100 captures image data using the one or more external cameras 116a and/or the one or more internal cameras 116b (210). The image data may be a single frame image and/or a multi-frame video. The single frame image and/or the multi-frame video may be stored or buffered in the memory 110.

In particular, one or more external cameras 116a may capture image data of the surrounding environment outside the vehicle 102. The one or more external cameras 116a may be positioned on an exterior of the vehicle 102 or within the interior of the vehicle 102 but directed outward toward the surrounding environment outside the vehicle 102. Each of the one or more external cameras 116a may capture a different image of a different perspective of the surrounding environment outside the vehicle 102 such that together all of the one or more external cameras 116a may capture a 360 degree perspective view of the surrounding environment. The different images may be later stitched, merged or otherwise combined to form a panoramic image and/or video.

One or more internal cameras 116b may capture image data of the environment within the vehicle 102. The one or more internal cameras 116b may be positioned within an interior of the vehicle 102 and directed toward the interior cabin of the vehicle 102 to monitor or capture image data of occupants within the vehicle 102. Each of the one or more internal cameras 116b may be directed to different portions of the interior cabin of the vehicle 102, such as the front cabin, rear cabin, and/or the driver-side and/or passenger side of the cabin. The one or more cameras 116b may also be positioned within a trunk of the cabin to capture image data within the trunk of the vehicle 102. The image data captured by the one or more internal cameras 116b may be a single frame image and/or a multi-frame video. The single frame image and/or the multi-frame video may be stored or buffered in the memory 110. Different perspectives and/or views may be captured and later stitched, merged or otherwise combined to form a panoramic image and/or video. The image data among all the cameras 116a-b may be combined or otherwise coalesced into an image or video that captures the entire environment inside and outside the vehicle 102 for a time period and the image data includes different objects within the environment inside and outside the vehicle 102.

Figure 3:
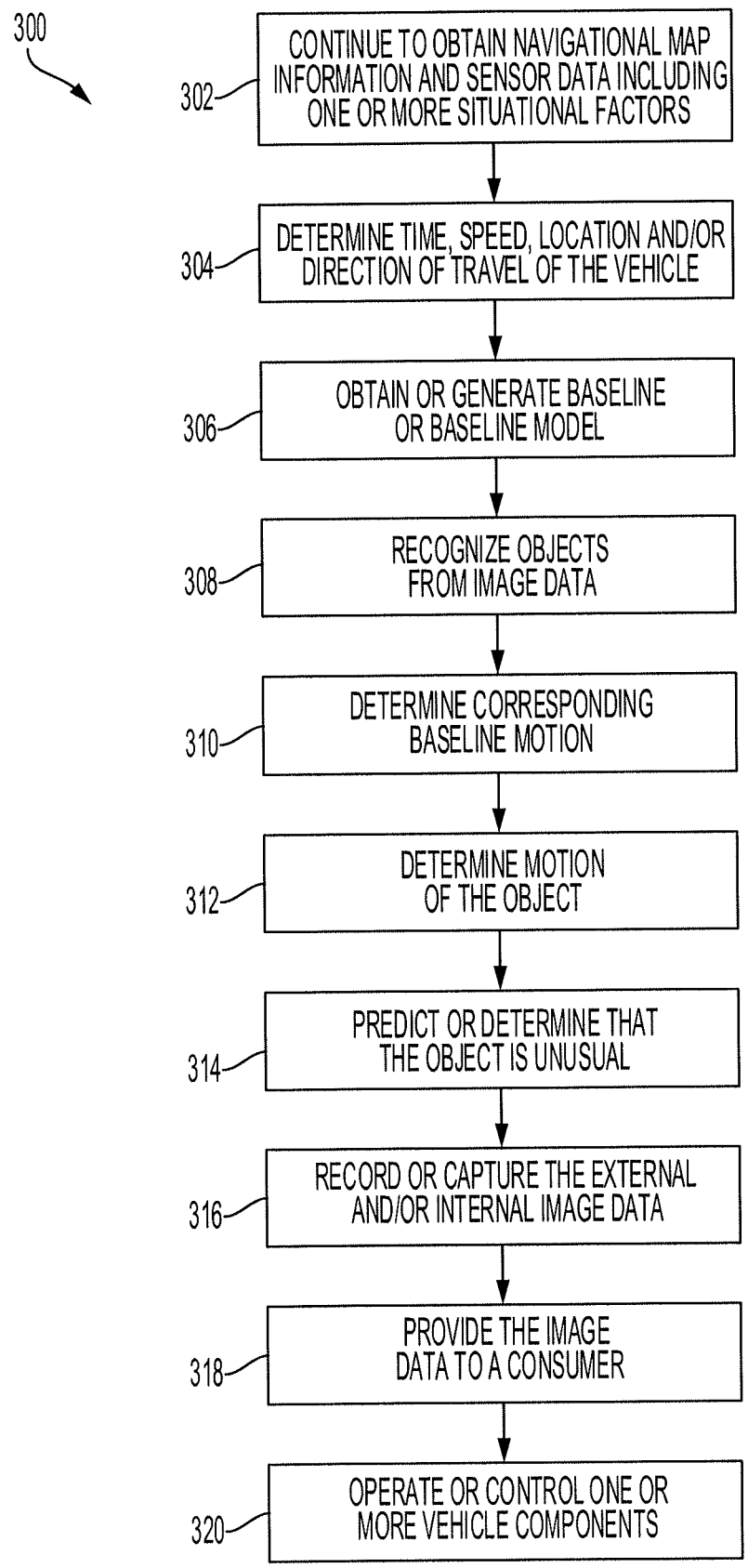
FIG. 3 is a flow diagram of an example process for detecting or predicting an unusual activity and taking action using the detection system of FIG. 1 according to an aspect of the invention.

FIG. 3 is a flow diagram of an example process 300 for detecting or predicting an unusual activity when the vehicle 102 is in motion and taking action. One or more computers or one or more data processing apparatuses, for example, the ECU 108 of the detection system 100 of FIG. 1, appropriately programmed, may implement the process 300.

Once the detection system 100 begins to capture image data to monitor for unusual activity, the detection system 100 continues to obtain navigational map information and sensor data including the one or more situational factors surrounding the vehicle 102, as described above (302). The detection system may determine current time of day, the current location, the current direction of travel, current road conditions, current weather condition, and/or the current speed of the vehicle 102 (304).

The detection system 100 may extract the current time of day and the current location from the navigational map information and determine the current direction of travel and/or the current speed of the vehicle 102 from the current location of the vehicle 102 over a period of time. For example, the detection system 100 may determine a first location of the vehicle 102 at a first point in time and a second location of the vehicle at a second point in time. The second point in time may be one or more seconds after the first point in time. Given the first location of the vehicle 102 and the second location of the vehicle 102, which is obtained one or more seconds after the first location of the vehicle 102, the detection system 100 may determine the current direction of travel. In some implementations, vehicle-to-infrastructure (V2I) communication may be used to determine the current time of day, the current location, the current direction of travel and/or the current speed of the vehicle 102.

Moreover, the detection system 100 may calculate the current speed of the vehicle 102 using the first location, the second location, the first point in time and the second point in time. For example, the detection system 100 calculates a distance between the first location and the second location and a difference in time between the first point in time and the second time. And then, the detection system 100 determines current speed as a function of the distance and the difference in time that has elapsed to cover that distance.

The detection system 100 obtains or generates a baseline or a baseline model of objects and their corresponding motions (306). The baseline or the baseline model is used to predict, determine or otherwise detect unusual activities. For example, the detection system 100 may predict when a motorcycle is riding past the vehicle 102 in a blind spot of the driver of the vehicle 102. In another example, the detection system 100 may predict when one or more surrounding vehicle may collide with the vehicle 102. In another example, the detection system 100 may predict when a driver of the vehicle will be intoxicated from drinking while operating the vehicle 102 or texting while operating the vehicle.

The baseline or the baseline model may be based on the current location of the vehicle 102, the time of day, the weather, the navigational map information and/or one or more situational factors. The detection system 100 may determine that the vehicle 102 is traveling on a residential roadway based on the current location of the vehicle 102 and the navigational map information, and in response, the detection system 100 may select a baseline or baseline model that is specific to travel on roadways in residential areas, which may be different than travel on an interstate highway. For example, a ball in proximity to a residential roadway is more normal in residential areas than on highways, and thus, is less unusual on the residential roadway. In another example, an object overhanging the back of a vehicle in front of the vehicle 102 is more likely to occur on a highway than in a residential area, and thus, is less unusual on a highway.

Other factors may influence the baseline or baseline model used to represent the normal behavior given the current situation. For example, when the one or more situational factors indicate that the cross-traffic has a green light, a vehicle traveling in the flow of the cross-traffic that does not slow down but instead speeds up as the vehicle enters the intersection would not be unusual. Whereas, when the one or more situational factors indicate that the cross-traffic has a red light, a vehicle traveling in the cross-traffic that speeds up and does not slow down when approaching the intersection would be unusual. Thus, the baseline or baseline model used may be different when the vehicle 102 is travelling in different locations and/or under different situational factors. This allows the detection system 100 to adapt to different situations in establishing an appropriate baseline.

Figure 4:
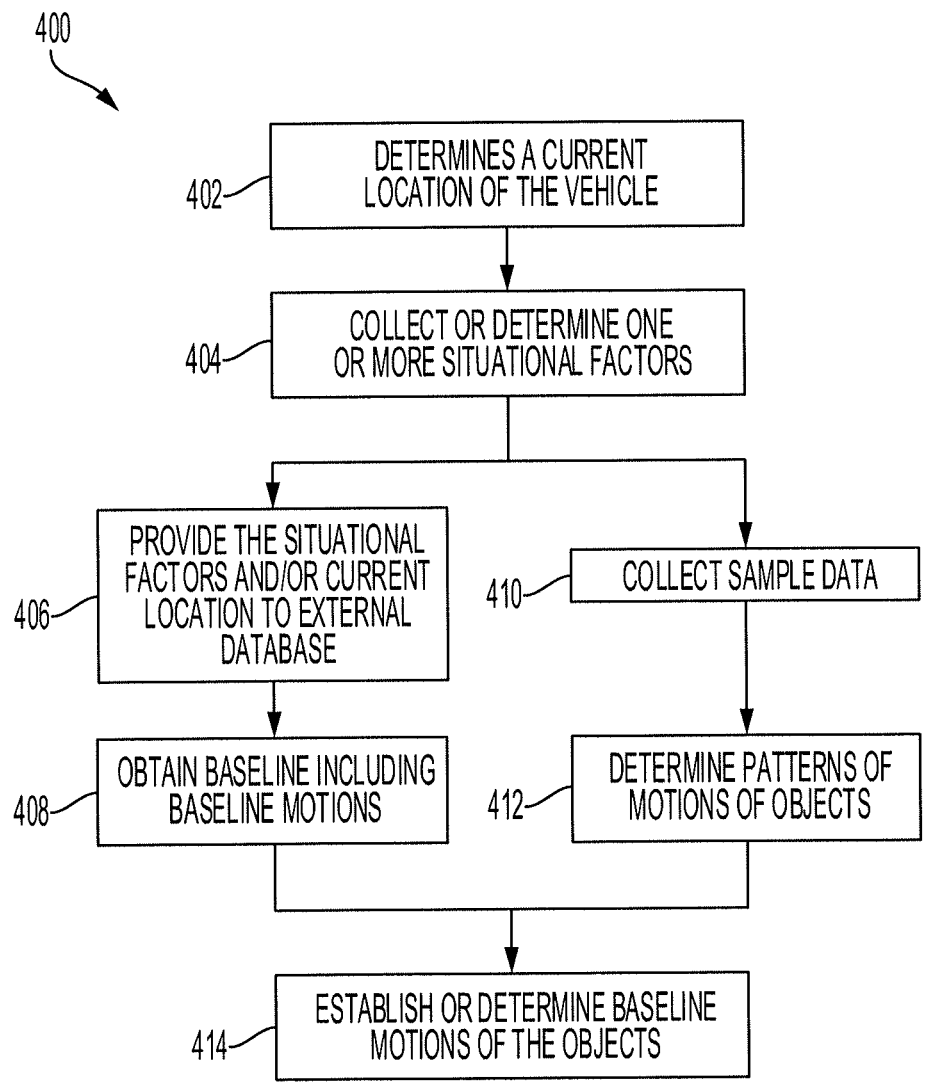
FIG. 4 is a flow diagram of an example process for generating, establishing or otherwise determining the baseline motions of objects using the detection system of FIG. 1 according to an aspect of the invention.

The detection system 100 may provide the current location of the vehicle 102, the navigational map information and/or one or more situational factors to the external database 104. In response, the external database 104 may provide the corresponding baseline or the baseline model to the detection system 100, which the detection system 100 receives. FIG. 4 further describes obtaining or generating the baseline or the baseline model. The generation and use of the baseline or the baseline model provides a control model for the detection system 100 to compare the current situation with, which allows the detection system 100 to predictively determine when an unusual activity is about to occur. By modeling the typical objects and corresponding motions, the detection system 100 adaptively uses machine learning to predict a motion of an object that is not consistent with the surrounding environment of a location, and thus, predict that the motion of the object is unusual.

The detection system 100 recognizes objects from the image data (308). In order to recognize the different objects within the image data, the detection system 100 may segment, outline or otherwise map figures within the image data using multiple joints and segments. The segments may represent linear representations or outlines of an object and the joints may represent vertices, contours or other angles between the different segments.

Once the outline of the object is mapped, the detection system 100 may compare the representation of the multiple joints and segments to objects within a database of objects, which have already been mapped, to identify the object. For example, the detection system 100 may compare an outline of a vehicle to a stored outline of a vehicle and determine that the shape of the outlines match, and so the detection system 100 recognizes the object as a vehicle.

After the objects are recognized and are matched to a corresponding object within the database of objects, the detection system 100 determines the corresponding baseline motions of the objects (310). The baseline and/or baseline model may have multiple motions that correspond to and are associated with the object within the database of objects that matched the recognized object given the current location of the vehicle 102, the navigational map information and/or the one or more situational factors. These multiple motions may be considered the baseline motion of the object, and may be used to compare with the actual motion of the object to predict unusual activity when the vehicle is in motion.

The detection system 100 determines the motions of the objects (312). The motion of an object may include a speed of the motion and/or a direction that the motion is traversing, traveling or otherwise moving. For example, the detection system 100 may detect that another vehicle in front of the vehicle 102 is traveling at speed above the speed limit or swerving between lanes.

Once the detection system 100 segments, outlines or otherwise maps an object within the image data, the detection system 100 tracks the segment or outline of the object across multiple frames of the image data taken over a period of time. The period of time in between the capture of different frames of the image data may be pre-configured or pre-set. The detection system 100 may measure the distance and direction traveled by one or more points on the different segments or the outline of the object across different frames of the image data and calculate the speed of the motion of the object based on the measured distance and the period of time in between the capture of the different frames. The detection system 100 may use the relative direction that the one or more points traveled between different frames to determine the direction traveled by the object by connecting the one or more points at a first point in time to the one or more points at the second point in time, which forms a vector having both speed and direction, for example.

Figure 5:
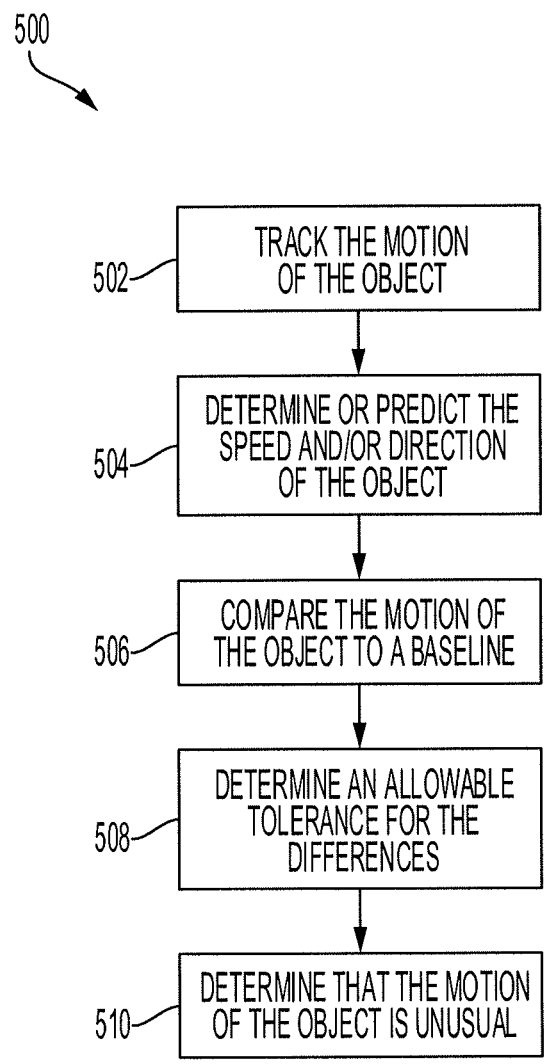
FIG. 5 is a flow diagram of an example process for determining whether a motion of the object is unusual using the detection system of FIG. 1 according to an aspect of the invention.

The detection system 100 predicts or determines that the motion of the object is unusual (314). The detection system 100 predicts or determines that the motion of the object is unusual before the object presents a danger to the vehicle 102, and thus, the detection system 100 is predictive and anticipates the unusual activity before the actual occurrence. The detection system 100 may predict or determine the unusual activity using a machine learning algorithm that utilizes the baseline or the baseline model to make the prediction or determination using patterns. A motion of the object is unusual when the motion presents a threat to the vehicle 102, such as when the object may collide with the vehicle 102, or when the motion of the object is not consistent with a baseline motion of the object within the surrounding environment. One example of an unusual action of an object is when the vehicle 102 is approaching an intersection and has the right-of-way, e.g., when the traffic signal light is green, and another vehicle in the cross-traffic does not reduce its speed when approaching the intersection. Another example of an unusual object is when the vehicle 102 is traveling on a roadway and another vehicle is accelerating toward the vehicle 102 from behind, such as a motorcycle passing the vehicle 102 from a blind spot, and/or at a pace that greatly exceeds the speed of the vehicle 102, such as when the other vehicle is attempting to tailgate the vehicle 102 and/or does not slow when the other vehicle approaches the vehicle 102 from behind. FIG. 5 further describes the process 500 by which the detection system 100 predicts or determines that the motion of the object is unusual.

In response to determining that the motion of the object is unusual, the detection system 100 may buffer, record or capture the external image data and/or the internal image data (316). The detection system 100 may already be buffering the external image data and/or the internal image data in the memory 110 prior to detecting that the object or the action of the object is unusual. When the detection system 100 detects that the object or the action of the object is unusual, the detection system 100 may set a timer to stop the buffering of the external and/or internal image data after a set amount of time. When the set amount of time expires, the detection system 100 may stop the recording and/or capturing of the external image data and/or the internal image data and store the external image data and/or internal image data in the memory 110.

The set amount of time may be pre-configured or configured via user input through the user interface 122. The set amount of time may be different for the internal cameras 116b and/or the external cameras 116a. For example, the recording of the internal image data may start later and/or end later than the recording of the external image data. In another example, the recording of the external image data and the internal image data may occur at the same time.

Any image data that is captured outside the window of when the buffered image data begins and when the set amount of time ends may be deleted or otherwise removed from the memory 110 to save computing resources. Since the buffered external image data and/or internal image data begins recording before the unusual object or action is detected and until the set amount of time afterwards, the detection system 100 records and stores external and/or internal image data before, during and after the unusual activity.

In some implementations, the detection system 100 begins buffering and recording the image data after the determination that the motion is unusual. By activating the recording and/or buffering of the image data after detection of the unusual motion, the detection system 100 reduces the amount of energy needed to operate the external cameras 116a and/or the internal cameras 116b, which increases the energy efficiency of the vehicle 102.

The detection system 100 may provide the image data to a consumer (318). A consumer is a computing device of a person, a government agency, a business or other entity that may use the external and/or internal image data. For example, a government agency, such as the police department, may use the external and/or internal image data to supplement an accident report or a citation report. In another example, the detection system 100 may provide the external image data that includes image data of the vehicle that collided with the vehicle 102 including the license plate number, make and model of the vehicle and circumstances of the accident, to an insurance company to accompany a claim. In another example, the detection system 100 may upload information that indicates that there is another vehicle that is acting unusually to a third-party server via the network access device 120 or to other surrounding vehicles via V2V communication. In another example, the detection system 100 may provide the internal image data that includes image data of a driver texting, drinking, eating or otherwise distracted to a device of the owner of the vehicle.

The detection system 100 may operate or control one or more vehicle components in response to the detecting that the motion of the object is unusual (320). The detection system 100 may alert and notify a third-party, such as the owner of the vehicle 102, the police or a security service provider when the unusual activity is detected, for example. The detection system 100 may perform other actions, such as slow the vehicle 102 to a stop on the side of the roadway when the detection system 100 detects that the driver has been drinking alcohol. Other actions may include opening the windows, activating an activating an audio and/or visual alert to alert a distracted driver and/or applying the brakes. For example, the detection system 100 may apply the brakes when the detection system 100 detects an individual crossing in front of the vehicle 102 while the vehicle 102 is in motion. In another example, the vehicle 102 may steer the wheel just enough to avoid a minor collision without causing any accident.

FIG. 4 is a flow diagram of an example process 400 for generating, establishing or otherwise determining the baseline motions of objects. One or more computers or one or more data processing apparatuses, for example, the ECU 108 of the detection system 100 of FIG. 1, appropriately programmed, may implement the process 400.

The detection system 100 determines a current location of a vehicle 102, as described above (402). After the detection system 100 determines the current location of the vehicle 102, the detection system 100 collects or determines one or more situational factors at the current location, as described above, and associates the situational factors with the current location (404). The situational factors may include the state of a traffic signal, the density of traffic surrounding the vehicle 102, the current time of day, and/or the ambient surrounding of the current location of the vehicle 102.

The detection system 100 may provide the one or more situational factors and/or the current location of the vehicle to the external database 104 (406), and in response, obtain a corresponding baseline including the baseline motions of the objects that are normally present at the current location (408). The baseline motions may include a speed and a direction component. The external database 104 may account for the time of day, the current location of the vehicle 102 and/or the one or more situational factors to determine the baseline. For example, a vehicle that is traveling on a roadway will behave differently when the traffic signal in an approaching intersection indicates a green light, a red light and/or a yellow light. In another example, a motorcycle that is behind the vehicle 102 will behave differently in passing the vehicle 102 when traffic surrounding the vehicle 102 is light than when the traffic surrounding the vehicle is dense. Other examples include when a vehicle in front of the vehicle 102 may behave differently when traveling a dirt road than a normal roadway. The vehicle in front of the vehicle 102 may swerve more to avoid potholes, for example, when traveling a dirt road or a roadway known for many potholes, than on a normal roadway that is smoot and without potholes. Thus, a vehicle in front of the vehicle 102 that is swerving may be normal on the dirt road or the roadway known for many portholes, but may be unusual on a normal roadway, for example.

In some implementations, the detection system 100 may collect sample data of the various combinations of the situational factors, the current time of day and/or the current location of the vehicle 102 (410) and determine patterns of motions of the objects that are associated with the current location (412). The detection system 100 may track the motions of the objects and when the motions of the objects are repeated a number of times, the detection system 100 may determine that there is a pattern of motions and those motions are part of the baseline motions for those objects within the surrounding environment. For example, when the traffic signal for the cross traffic is red, the vehicles in the cross traffic may slow and eventually stop before entering the intersection a number of times greater than a threshold amount and the motion of stopping before entering the intersection would be considered normal and part of the baseline. In another example, when a driver is driving the vehicle 102, the driver is typically not swinging their arm up and down, e.g., in an eating and/or drinking motion, instead, the arms of the driver are typically on the steering wheel of the vehicle, and thus, the arms being extended so that the hand holds onto the steering wheel would be the normal position and part of the baseline.

As the detection system 100 collects more sample data, the detection system 100 may continuously update the baseline motions of the baseline objects associated with the location and different situational factors. For example, as a motion of an object appears more frequently and/or is present in a larger percentage of the sample size, the detection system 100 may increase a likelihood that that the motion of the object is normal, not unusual and is likely part of the baseline. Whereas, if the motion of the object appears less frequently and/or present in a smaller percentage of the sample size, the detection system 100 may decrease a likelihood that the motion of the object is normal, not unusual and less likely part of the baseline. The percentage or frequency necessary for inclusion in the baseline may be pre-determined and/or user-configured.

Once the patterns are determined and/or the baseline motions of the object are obtained, the detection system 100 establishes or determines the baseline motions of the objects based on the patterns and/or obtained baseline (414). The baseline motions of the objects establish the normal behavior or motions of the objects at the current location when the one or more situational factors are present. These baseline motions of the objects assist the detection system 100 to anticipate, predict or determine when the motion of the object is unusual.

FIG. 5 is a flow diagram of an example process 500 for determining whether a motion of the object is unusual. One or more computers or one or more data processing apparatuses, for example, the ECU 108 of the detection system 100 of FIG. 1, appropriately programmed, may implement the process 500.

Once the detection system recognizes the object, the detection system 100 tracks the motion of the object (502). The detection system 100 may track, follow or otherwise map an outline and/or frame of the object using different segments and/or joints over time from the image data to determine the motion of the object across different frames of the image data, which are taken at different times. For example, the detection system 100 may map an outline of another vehicle in front of, behind or adjacent to the vehicle 102 or within the cross-traffic and follow the map of the outline through multiple frames of the image data to track the motion of the object over a period of time. In another example, the detection system 100 may map an outline of an arm, a hand and fingers of the individual and follow the map of the outline through multiple frames of the image data to track the motion of the object over the period of time.

Once tracked, the detection system 100 may determine or predict the speed and/or direction of the motion of the object (504). The detection system 100 measures the relative distance of one or more points on the outline of the object in different frames of the image data at different times and calculates the speed as a function of the relative distance and time between the different frames. Moreover, since the one or more points on the object are tracked across different frames, the detection system 100 may determine the direction of the motion. The speed and the direction form the components of the motion of the object.

The detection system 100 compares the motion of the object to a baseline (506). The baseline may correspond to and/or be associated with the current location of the vehicle 102 and/or the one or more situational factors at the current location of the vehicle 102. The baseline may be established, as described above in FIG. 4. The detection system 100 may determine whether the object matches one of the baseline objects. Once the baseline object is determined, the detection system 100 obtains the baseline motion associated with the matched baseline object associated with the current location and/or the one or more situational factors.

The detection system 100 compares the motion of the object to the corresponding baseline motion. The detection system 100 may compare different components of the motion, such as the speed of the object and/or the direction that the object is traveling, with the components of the baseline motion, such as the normal speed and direction of the baseline object, respectively, given the other factors, such as the current location and/or the one or more situational factors.

For example, when the vehicle 102 is approaching an intersection and has the right-of-way and the traffic signal indicates a stop or yield signal to the cross-traffic, the baseline motions of an object, such as a vehicle in the cross-traffic, may include a deceleration of the vehicle to a full stop before entering the intersection. The detection system 100 compares the expected deceleration and eventual full stop of the vehicle in the baseline to the determined or predicted speed and/or direction of the motion of the vehicle.

In another example, the baseline motion of an object, such as a vehicle in front of the vehicle 102, may include a slight deceleration in anticipation that the vehicle in front is preparing to turn or a constant speed or an increase in acceleration in a straight direction when the vehicle in front of the vehicle 102 plans on continuing on the same path forward. The detection system 100 compares the expected speed and/or direction of the vehicle in front in the baseline to the determined or predicted speed and/or direction of the motion of the vehicle in front of the vehicle 102.

In another example, the baseline motion of an object, such as an arm of the individual, may include the arm extended out and the hand holding the steering wheel while the fingers are wrapped around the steering wheel without much movement. The detection system 100 compares an expected speed and/or direction of the arm, hands and fingers in the baseline to the determined or predicted speed and/or direction of arms, hands and fingers of the individual.

The detection system 100 may determine an allowable tolerance for the differences in the motion of the object with the baseline motion of the object (508). The detection system 100 may determine the allowable tolerance based on sensor data and/or navigational map information, which may be obtained as described above. The navigational map information may include entity information, such as the location of the liquor store and/or restaurants.

For example, the detection system 100 may identify that the location of the vehicle 102 traversed or stopped at location of the entity for a period of time, which may indicate that the driver may have frequented the entity, such as a liquor store and/or restaurant. Since the vehicle 102 was at the location for a period of time, the detection system 100 may infer that the driver of the vehicle 102 may likely be distracted or otherwise disengaged due to consuming a drink or food and may lower the allowable tolerance.

In another example, the navigational map information may include weather information and/or a current time of day, and the detection system 100 may determine that the weather is snowing or that it is the evening time. Since the weather is snowing and/or it is the evening time, the detection system 100 may lower the allowable tolerance so that the driver of the vehicle 102 may have more time to react to any unusual activities. By adjusting the sensitivity of the allowable tolerance, the detection system 100 is able to account for different variabilities between the current situation of the vehicle 102 and the baseline.

The detection system 100 determines that the motion of the object is unusual based on the comparison between the motion of the object and the baseline motion of the baseline object corresponding to the object (510). The detection system 100 determines that the motion of the object is unusual when the motion of the object is different than the baseline motion of the baseline object, such as when the object may be traveling at a different speed or rate of speed than the expected speed from the baseline motion and/or when the object may be traveling in a different direction than the expected direction from the baseline motion. For example, if the speed of the motion of the vehicle is a continued acceleration into the intersection, whereas, the baseline motion of the vehicle is a deceleration to a full stop when the traffic signal indicates a stop or yield signal, the detection system 100 may determine that the motions are different and that the motion of the object, i.e., the vehicle in the cross-traffic, is unusual. In another example, if the speed of the motion of the vehicle in front is a sudden deceleration or the direction of the vehicle in front is swerving, the detection system 100 may determine that the motions are different and that the motion of the object, i.e., the vehicle in front of the vehicle 102, is unusual. In another example, if the arm of the individual is moving up and down, the hand is grasping a cup or phone, or the fingers are moving up and down in a typing motion, the detection system 100 may determine that the motions are different and that the motion of the object, i.e., the arm, hand or fingers, is unusual.

When determining that the motion of the object is different than the baseline motion and/or unusual, the detection system 100 may factor in the allowable tolerance. For example, on a bright clear sunny day and with few surrounding vehicles, the detection system 100 may allow for a larger allowable tolerance in the speed of the vehicles in the cross-traffic because the driver of the vehicle 102 has a clear view of the cross-traffic. In another example, on the bright clear sunny day and with the few surrounding vehicles, the detection system 100 may allow the driver of the vehicle 102 to be more distracted than when the vehicle 102 is surrounded by many vehicles and it is raining because the distraction presents less of a danger.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A detection system for a vehicle, comprising:
   a first camera configured to capture first image data including a first plurality of objects in an environment;
   a memory configured to store image data; and
   an electronic control unit coupled to the first camera and the memory and configured to:
   obtain, from the first camera, the first image data including the first plurality of objects,
   determine a motion of an object of the first plurality of objects based on the first image data,
   compare the motion of the object to a baseline motion for the object,
   determine that the motion of the object will be different than the baseline motion for the object based on the comparison, and
   record and capture, in the memory and using the first camera, the first image data for a time period before and after the determination that the motion of the object will be different than the baseline motion.

2. The detection system of claim 1, further comprising:
   a vehicle speed sensor or a navigation unit configured to detect or determine a vehicle speed of the vehicle; and
   wherein the electronic control unit is further configured to:
   determine that the vehicle is moving based on the vehicle speed of the vehicle, and
   activate the first camera in response to determine that the vehicle is moving.

3. The detection system of claim 1, wherein the first camera includes a plurality of external cameras that are configured to capture different views of the environment outside the vehicle.

4. The detection system of claim 1, wherein the electronic control unit is configured to:
   recognize the object among the first plurality of objects; and
   match the object to a baseline object that is associated with a corresponding baseline motion, wherein the corresponding baseline motion is used as the baseline motion for the object.

5. The detection system of claim 1, further comprising:
   a second camera configured to capture second image data of a passenger compartment of the vehicle; and wherein the electronic control unit is configured to:
   obtain, from the second camera, the second image data of the passenger compartment including a second plurality of objects,
   determine motions of each of the second plurality of objects, and
   determine that a motion of an object of the second plurality of objects is different than a second baseline motion.

6. The detection system of claim 5, wherein the electronic control unit is further configured to:
   record and capture, in the memory and using the second camera, the second image data for a time period before and after the determination that the motion of the object of the second plurality of objects is different than the second baseline motion.

7. The detection system of claim 5, further comprising:
   a navigation unit configured to obtain navigational map information including a location of an entity and a current location of the vehicle, wherein the electronic control unit is further configured to:
   activate the second camera when the current location of the vehicle is within a threshold distance of the location of the entity.

8. The detection system of claim 5, wherein the electronic control unit is further configured to:
   alert or notify a user of a user device that an unusual activity is occurring in response to the determination that the motion of the object of the second plurality of objects is different than the second baseline motion.

9. A detection system for a vehicle, comprising:
a first camera configured to capture first image data of a surrounding environment of the vehicle including a first plurality of objects within the surrounding environment;
a second camera configured to capture second image data of a passenger compartment of the vehicle including a second plurality of objects within the passenger compartment of the vehicle;
a memory configured to store the first image data and the second image data; and
an electronic control unit coupled to the first camera, the second camera and the memory and configured to:
determine motions of each of the first plurality of objects within the surrounding environment based on the first image data,
determine motions of each of the second plurality of objects within the passenger compartment based on the second image data,
determine that the motion of a first object of the first plurality of objects or a second object among the second plurality of objects is different than a first baseline motion or a second baseline motion, respectively, and
record and capture, in the memory, the first image data or the second image data.

10. The detection system of claim 9, further comprising:
at least one of a vehicle speed sensor or a navigation unit configured to detect or determine a vehicle speed of the vehicle; and
wherein the electronic control unit is further configured to:
determine that the vehicle is moving based on the vehicle speed of the vehicle, and
activate the first camera and the second camera in response to determining that the vehicle is moving.

11. The detection system of claim 9, wherein the first camera includes a plurality of external cameras that are configured to capture different views of the surrounding environment outside the vehicle.

12. The detection system of claim 9, wherein the second camera includes a plurality of interior cameras that are configured to capture different views of the passenger compartment of the vehicle.

13. The detection system of claim 9, wherein the electronic control unit is configured to:
recognize the first object among the first plurality of objects;
match the first object to a first baseline object and a corresponding baseline motion, wherein the corresponding baseline motion is used as the first baseline motion; and
compare the motion of the first object to the first baseline motion.

14. The detection system of claim 13, wherein to determine that the motion of the first object or the second object is different than the first baseline motion or the second baseline motion, respectively, the electronic control unit is configured to:
determine that the motion of the first object is different than the first baseline motion based on the comparison.

15. A method for detecting an unusual activity, comprising:
obtaining, by a processor and from a first camera, first image data of a surrounding environment including a first plurality of objects;
determining, by the processor, motions of each of the first plurality of objects within the surrounding environment based on the first image data;
determining, by the processor, that the motion of an object of the first plurality of objects within the surrounding environment will be different than a baseline motion for the object based on a current speed of the motion of the object; and
recording, in memory and by the processor and using the first camera, the first image data.

16. The method of claim 15, wherein recording the first image data includes recording the first image data for a time period before and after determining that the motion of the object will be different than the baseline motion.

17. The method of claim 15, further comprising:
obtaining, from a second camera and by the processor, second image data of a passenger compartment including a second plurality of objects;
determining, by the processor, motions of each of the second plurality of objects;
determining, by the processor, that a motion of an object of the second plurality of objects is different than a second baseline motion; and
in response to determining that the motion of the object of the second plurality of objects is different than the second baseline motion, recording, in the memory and by the processor using the second camera, the second image data.

18. The method of claim 15, further comprising:
determining, using at least one of a vehicle speed sensor or a navigation unit, a vehicle speed of a vehicle;
determining, by the processor, that the vehicle is moving based on the vehicle speed of the vehicle; and
activating, by the processor, the first camera in response to determining that the vehicle is moving.

19. The method of claim 15, further comprising:
determining, by the processor, one or more surrounding environmental factors based on the first image data;
determining, by the processor the baseline motion for the object based on the one or more surrounding environmental factors;
determining a current direction and the current speed of the motion of the object; and
determining, by the processor, that the predicted motion of the object will be different than the baseline motion further based on the current direction of the motion of the object.

20. The method of claim 15, further comprising:
obtaining, from a second camera and by the processor, second image data of a passenger compartment including a second plurality of objects;
determining, by the processor, motions of each of the second plurality of objects;
determining, by the processor, that a motion of an object of the second plurality of objects is different than a second baseline motion; and
recording and capturing, in the memory and by the processor, the second image data for a time period before and after the determination that the motion of the object of the second plurality of objects is different than the second baseline motion.

21. A detection system for a vehicle, comprising:
a camera configured to capture image data including a plurality of objects in an environment when the vehicle is moving;
a memory configured to store the image data; and
an electronic control unit coupled to the camera and the memory and configured to:
obtain, from the camera, the image data including the plurality of objects, recognize an object among the plurality of objects, determine a motion of the object of the plurality of objects based on the image data, match the object to a baseline object that is associated with a corresponding baseline motion, wherein the corresponding baseline motion is used as a baseline motion for the object, determine that the motion of the object will be different than the baseline motion for the object, and record and capture, in the memory and using the camera, the image data for a time period before and after the determination that the motion of the object will be different than the baseline motion.

22. A method for detecting an unusual activity, comprising:

obtaining, by a processor and from a first camera, first image data of a surrounding environment including a first plurality of objects;

determining, by the processor, motions of each of the first plurality of objects within the surrounding environment based on the first image data;

determining, by the processor, that the motion of an object of the first plurality of objects within the surrounding environment will be different than a baseline motion for the object;

recording, in memory and by the processor and using the first camera, the first image data;

obtaining, from a second camera and by the processor, second image data of a passenger compartment including a second plurality of objects;

determining, by the processor, motions of each of the second plurality of objects;

determining, by the processor, that a motion of an object of the second plurality of objects is different than a second baseline motion; and recording, in the memory and by the processor, the second image data.

23. The method of claim 22, wherein recording the second image data is in response to determining that the motion of the object of the second plurality of objects is different than the second baseline motion.

24. The method of claim 22, wherein recording the second image data is for a time period before and after the determination that the motion of the object of the second plurality of objects is different than the second baseline motion.

25. A detection system for a vehicle, comprising:

a first camera configured to capture first image data including a first plurality of objects in an environment when the vehicle is moving;

a second camera configured to capture second image data of a passenger compartment of the vehicle;

a memory configured to store image data; and an electronic control unit coupled to the first camera, the second camera and the memory and configured to:

obtain, from the first camera, the first image data including the first plurality of objects, determine a motion of an object of the first plurality of objects based on the first image data, determine that the motion of the object will be different than a baseline motion for the object, record and capture, in the memory and using the first camera, the first image data for a time period before and after the determination that the motion of the object will be different than the baseline motion, obtain, from the second camera, the second image data of the passenger compartment including a second plurality of objects, determine motions of each of the second plurality of objects, and determine that a motion of an object of the second plurality of objects is different than a second baseline motion.

* * * * *